(12) United States Patent
    Robbins

(10) Patent No.: US 11,030,578 B2
(45) Date of Patent: Jun. 8, 2021

(54) USING VACATION AUTOMATIC REPLIES TO ENHANCE BULK MARKETING CAMPAIGNS

(71) Applicant: International Business Machines Corporation, Armonk, NY (US)

(72) Inventor: Kenneth L. Robbins, Sudbury, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 709 days.

(21) Appl. No.: 13/769,521

(22) Filed: Feb. 18, 2013

(65) Prior Publication Data

US 2014/0236982 A1    Aug. 21, 2014

(51) Int. Cl.
    *G06Q 10/10* (2012.01)
    *G06Q 30/02* (2012.01)

(52) U.S. Cl.
    CPC ......... *G06Q 10/10* (2013.01); *G06Q 30/0251* (2013.01)

(58) Field of Classification Search
    CPC ........................... G06Q 10/10; G06Q 30/0251
    See application file for complete search history.

(56) References Cited

U.S. PATENT DOCUMENTS

| | | | |
|---|---|---|---|
| 8,280,965 B2 | 10/2012 | DellaFera et al. | |
| 8,296,370 B2 | 10/2012 | Adams et al. | |
| 9,313,151 B1 * | 4/2016 | Wheeler | G06Q 10/107 |
| 2002/0188689 A1 | 12/2002 | Michael | |
| 2007/0192418 A1 | 8/2007 | Adams et al. | |
| 2007/0250904 A1 * | 10/2007 | Waller | G06F 21/6245 726/1 |
| 2008/0022097 A1 * | 1/2008 | Gillum et al. | 713/168 |
| 2008/0155026 A1 | 6/2008 | Daniels-Farrar et al. | |
| 2010/0011205 A1 * | 1/2010 | McKenna | G06F 21/62 713/150 |
| 2011/0191424 A1 * | 8/2011 | Cumming | 709/206 |
| 2012/0191546 A1 | 7/2012 | Phelan et al. | |
| 2013/0031184 A1 * | 1/2013 | Avitabile et al. | 709/206 |

(Continued)

OTHER PUBLICATIONS

A method for customizing the content and delivery of bulk electronic communications, Jun. 29 2010, 2 pages, www.ip.com.

(Continued)

*Primary Examiner* — Boris Gorney
*Assistant Examiner* — James E Heffern
(74) *Attorney, Agent, or Firm* — Steven M. Bouknight

(57) ABSTRACT

Methods and systems may provide for identifying a first set of recipients associated with an away status. Additionally, the first set of recipients may be removed from a second set of recipients associated with a bulk communications campaign to obtain a third set of recipients, wherein a first message may be sent to the third set of recipients. It may be determined that the away status has ceased for one or more of the first set of recipients, wherein a second message may be sent to the one or more of the first set of recipients for which the away status has ceased. The second message may reference the away status. Methods and systems may also provide for a brokering system to enable the transfer of away status information between different collectors of away status information and senders of messages.

6 Claims, 3 Drawing Sheets

(56) References Cited

U.S. PATENT DOCUMENTS

2013/0073662 A1* 3/2013 Meunier .................. G06F 15/16
709/206
2013/0110614 A1* 5/2013 Wagner et al. ............ 705/14.41
2014/0082098 A1* 3/2014 Collins et al. ................ 709/206

OTHER PUBLICATIONS

Non-Final Office Action for U.S. Appl. No. 14/081,898, dated May 4, 2016, 20 pages.
Office Action for U.S. Appl. No. 14/081,898, dated Aug. 22, 2014, 17 pages.
Final Office Action for U.S. Appl. No. 14/081,898, dated Mar. 13, 2015, 18 pages.
Final Office Action for U.S. Appl. No. 14/081,898, dated Jan. 5, 2017, 22 pages.
Office Action for U.S. Appl. No. 14/081,898, dated Aug. 18, 2017, 28 pages.
Final Office Action for U.S. Appl. No. 14/081,898, dated May 22, 2018, 31 pages.
Advisory Action for U.S. Appl. No. 14/081,898, dated Sep. 17, 2018, 10 pages.

* cited by examiner

FIG. 1
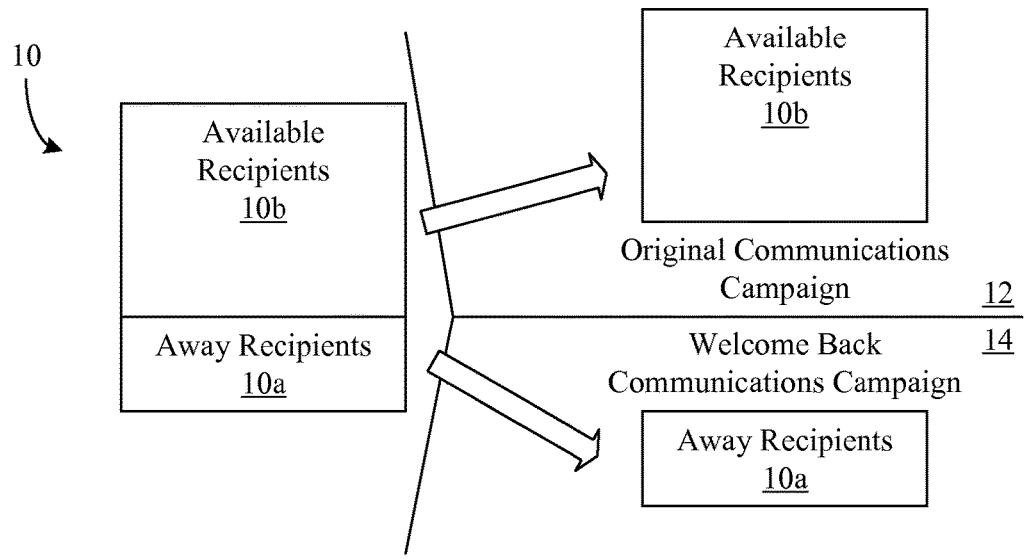
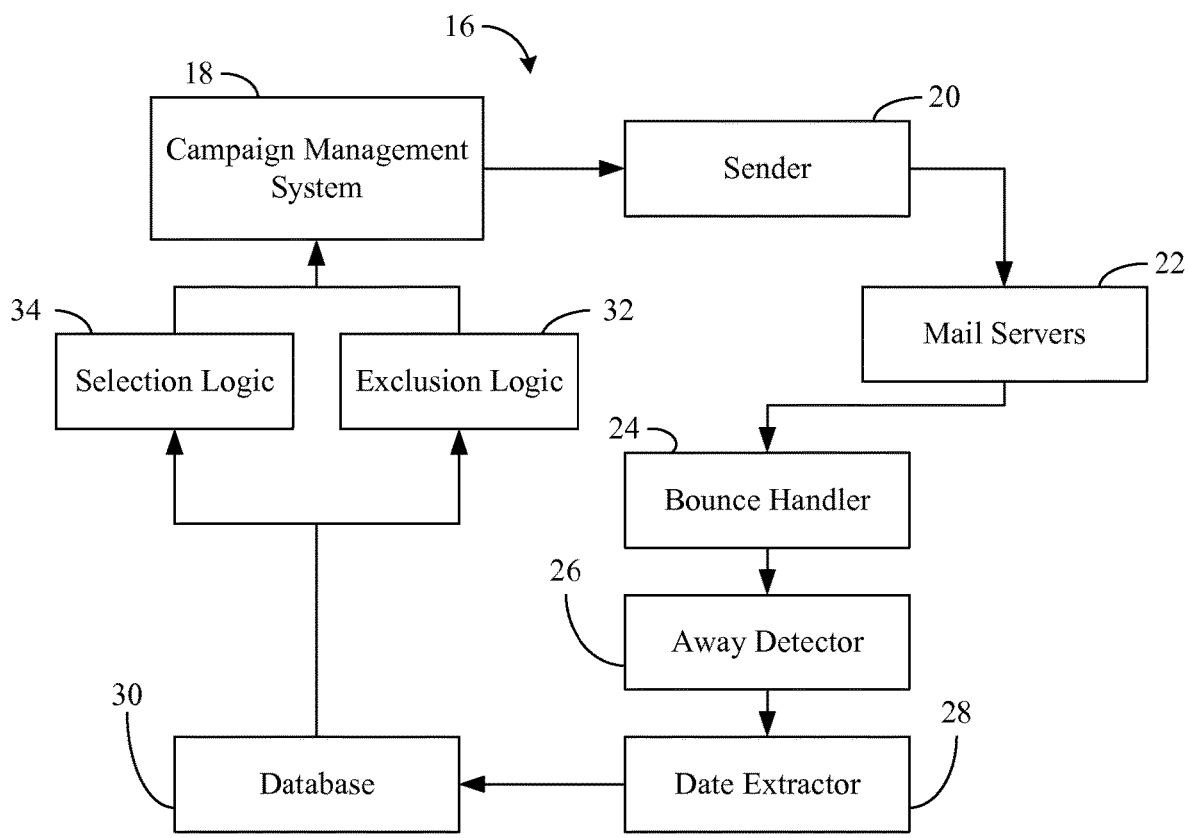
FIG. 2

FIG. 3
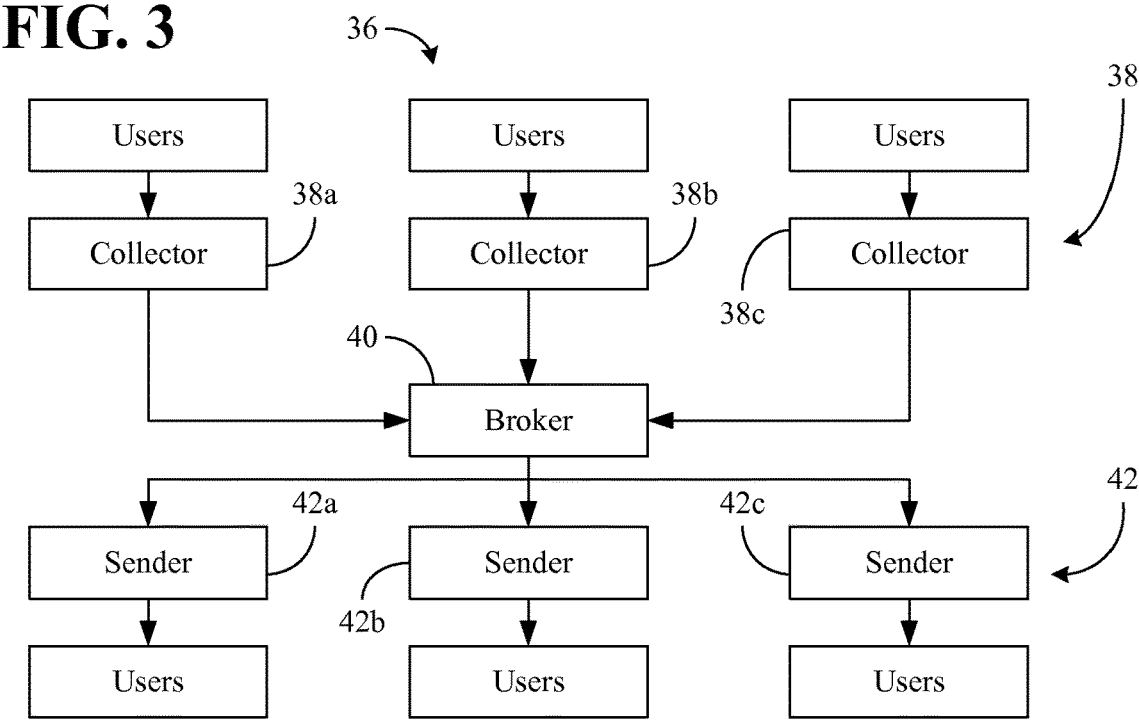
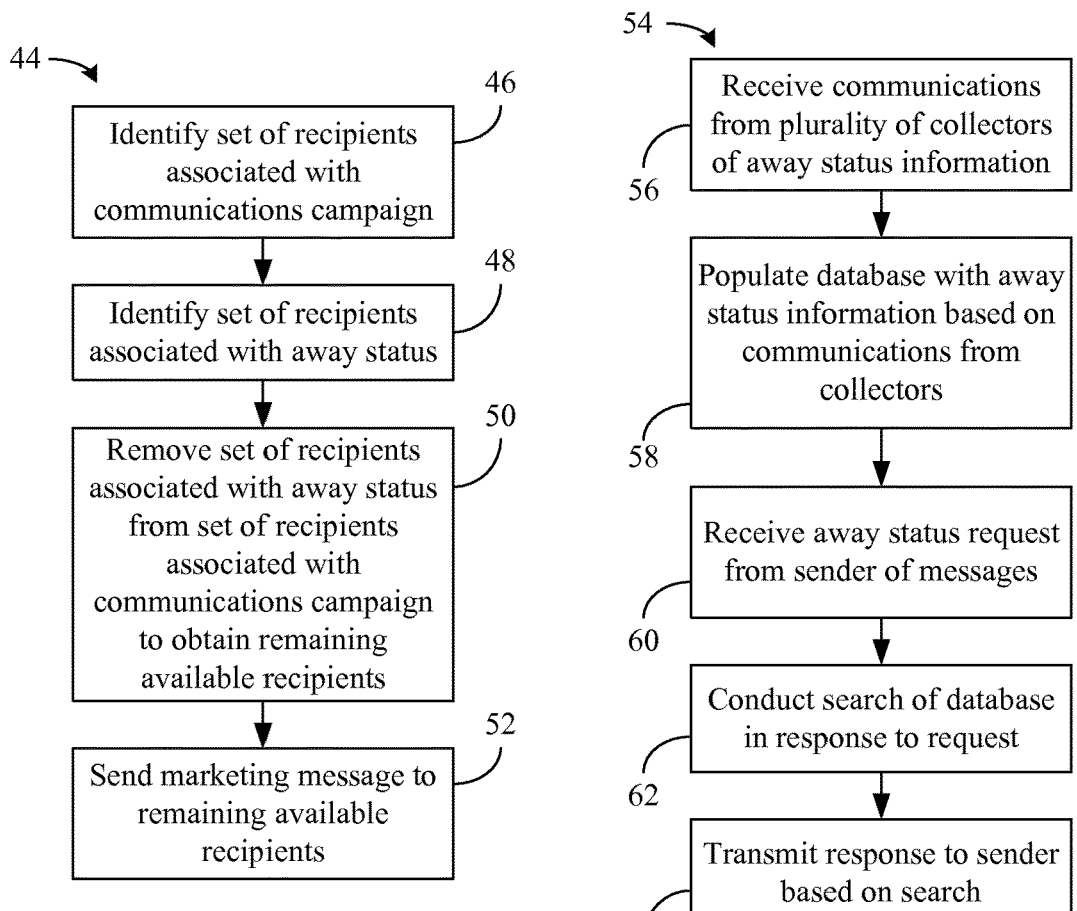
FIG. 4
FIG. 5

USING VACATION AUTOMATIC REPLIES TO ENHANCE BULK MARKETING CAMPAIGNS

BACKGROUND

Embodiments of the present invention generally relate to bulk communications campaigns. More particularly, embodiments relate to the use of out-of-office and on-vacation information to enhance the effectiveness of bulk communications campaigns.

Bulk communications campaigns may involve accumulating large lists of target recipients and sending messages to the target recipients in an effort to spur economic activity with regard to a particular product or service. It is not uncommon, however, for many targeted recipients to be out of the office or on-vacation when delivery of the emails is attempted. For example, existing email marketing solutions may simply ignore out-of-office automatic replies and continue to send emails to recipients who are away. As a result, a significant number of marketing campaign emails may go unread until the targeted recipients return, wherein consumers who encounter many superfluous marketing emails upon returning from vacation may become annoyed and might even be motivated to opt out of future marketing campaigns. Moreover, the transmission of those unread emails may have a negative impact on the amount of time taken to fulfill/complete the campaign, resource utilization and network bandwidth (e.g., unnecessarily contributing to network congestion).

BRIEF SUMMARY

Embodiments may include a method involving the identification of a first set of recipients associated with an away status. The method may also provide for removing the first set of recipients from a second set of recipients associated with a bulk communications campaign to obtain a third set of recipients. A first message may be sent to the third set of recipients.

Embodiments may include a computer program product having a computer readable storage medium and computer usable code stored on the computer readable storage medium. If executed by a processor, the computer usable code may cause a computer to identify a first set of recipients associated with an away status and remove the first set of recipients from a second set of recipients associated with a bulk communications campaign to obtain a third set of recipients. The computer usable code, if executed, may also cause a computer to send a first message to the third set of recipients.

Embodiments may include a computer program product having a computer readable storage medium and computer usable code stored on the computer readable storage medium. If executed by a processor, the computer usable code may cause a computer to receive a first communication from a first collector of away status information, wherein the first communication is to include first cryptographic information and first away status information. The computer usable code may also cause a computer to populate a database with the first cryptographic information and the first away status information, and receive a second communication from a sender of messages, wherein the second communication is to include a request for away status information and second cryptographic information. In addition, the computer usable code may cause a computer to conduct a search of the database in response to the request, and transmit a response to the sender of messages based on the search.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 1 is a block diagram of an example of a scheme of operating communications campaigns according to an embodiment;

FIG. 2 is a block diagram of an example of a communications campaign management architecture according to an embodiment;

FIG. 3 is a block diagram of an example of a brokering system architecture according to an embodiment;

FIG. 4 is a flowchart of an example of a method of operating communications campaigns according to an embodiment;

FIG. 5 is a flowchart of an example of a method of brokering away status information according to an embodiment.

DETAILED DESCRIPTION

Figure 6:
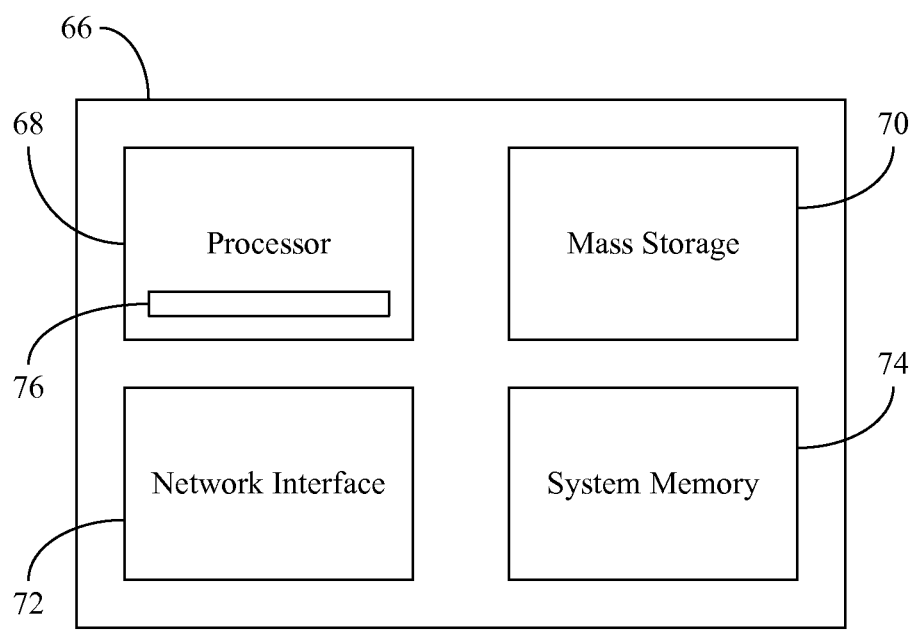
FIG. 6 is a block diagram of an example of a computing device according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a scheme of operating communications (e.g., marketing, advertising, educational, social networking, public safety, fundraising, political, etc.) campaigns is shown in which a plurality of target recipients 10 (10a, 10b) is partitioned into a set of away participants 10a and a set of available participants 10b. The number of target recipients 10 may be very large (e.g., 100,000 or more recipients), depending upon the circumstances. In the illustrated example, the available participants 10b are included in an "original" communications campaign 12, wherein the away recipients 10a are included in a "welcome back" communications campaign 14. As will be discussed in greater detail, the away participants 10a may be associated with an "away status" such as an out-of-office status, an on-vacation status, etc., that is determined from automatic replies, web forms, user configuration settings, and so forth.

The original communications campaign 12 may involve advertising and/or offering a product/service via targeted messages such as, for example, emails, text messages, instant messages, social media posts, web ads, mobile ads, postal mailings, faxes, voice messages (e.g., "robo calls"), and so forth, wherein the welcome back communications campaign 14 might advertise/offer those same products/services along with a personalized acknowledgement of each recipient's away status. For example, a targeted message to a particular recipient in the welcome back campaign 14 may be delayed until a configurable time period after the return of the recipient and modified to include an acknowledgement of the recipient's former unavailability and/or recent return (e.g., a reference to the recipient's away status). Delaying the communications messages until the away recipients 10a return may increase the likelihood of the messages being read by the away recipients 10a, reduce the likelihood of the away recipients 10a becoming annoyed by excessive and/or superfluous messages, reduce campaign fulfillment time, optimize resource utilization and reduce unnecessary network congestion.

The type of communication used to determine the away status may be different from the type of communication used to conduct the campaign. Thus, the away status might be determined from one type of communication (e.g., email auto reply), whereas the recipients may be targeted via another type of communication (e.g., text message). The targeting may be implemented by excluding recipients from the original communications campaign 12 and/or including recipients in the welcome back campaign 14.

FIG. 2 shows an architecture 16 that may be used to manage communications campaigns. In general, the illustrated architecture 16 provides for detecting, and then respecting, the implied wishes of targeted recipients by examining the content of their automatic email replies. More particularly, a campaign management system 18 may select a list of recipients from a database, create personalized messages, and pass them to a sender 20. The sender 20 can be an email server (e.g., a simple mail transfer protocol/

SMTP server) that sends the personalized messages to the recipients' respective mail servers 22 using, for example, their email addresses. If a given email recipient has enabled an "out-of-office" or "vacation" auto responder, then their respective mail server may automatically generate an "away" reply to the email address designated by the sender 20 in the original message (e.g., determined by the Reply-To, or From headers, or SMTP envelope-From value).

A bounce handler 24 may receive various inbound email messages including away automatic replies, wherein the bounce handler 24 may pass the email headers and the message body through format decoders (e.g., multipurpose Internet mail extension/MIME decoders) so that the headers and body can be passed through a classifier to determine how to handle the inbound message. A sub-component of the classifier may be an away detector 26 that applies various heuristic rules to determine if the message is an away message. In some cases, one or more of the mail servers 22 can embed specific headers that explicitly or implicitly designate a message as an away reply. If such a rule is matched, then the message may be marked as an away message and passed to a date extractor 28.

If the header checks do not trigger an away message detection, then the text of the body may also be examined. There are multiple approaches to determining whether a message is an away message based on the body of the message. These approaches include applying a set of regular expressions, using a Bayesian classifier, using a neural network classifier, and or other document classification techniques. Typically, these techniques may be supervised and trained on a corpus of emails that are known to be away messages along with a corpus of sample emails that are known to be bounce backs that are not away messages. The supervised classifiers may be effective when operating in multiple languages. Regular expressions may also be effective for multiple languages, but they may be more difficult to develop and maintain for broad language support. In one example, only the first N words are examined since the keywords that indicate an away reply may tend to appear at the beginning of a message.

For the regular expression approach, the regular expressions may be tuned to search for words that are typically used in away responses. This approach may include taking into consideration phrases in multiple languages, matching against the original language and foregoing translation since phrasing may tend to be highly idiomatic. The presence of month names, day names, and numeric date formats may also be included in the regular expressions to help determine if a message is an away message. Any message that is classified as an away message can be passed to the date extractor 28 for further processing. Some implementations may combine the away detector 26 and the date extractor 28.

The illustrated date extractor 28 finds and extracts dates that appear within the first N words of the message, wherein dates that are found may be converted into a normalized representation. If there are multiple dates, then the highest value may be chosen as the end date. Moreover, dates may be compared to the current date and ignored if not within a configurable time in the future. Dates can also be extracted using regular expressions for various date formats in various languages. Additionally, consideration may be applied to surrounding words that provide hints for which date is the return date. For example, applied rules may process the phrase "leaving on December 20 and returning on January 4" and recognize that "December 20" is a start date to be ignored and "January 4" is an end date to be extracted as the relevant date. In this regard, confidence may be determined by the fact that January 4 is greater than December 20, January 4 appears after December 12, and January 4 is preceded by the word "returning". Indeed, more sophisticated natural language processing (NLP) can also be applied.

For each message that is determined to be an away message, a record may be added to a database 30, indicating that the corresponding recipient is away. If an end date was extracted with sufficient confidence, then an end date can be added to the record. If no end date is determined, then that fact might be indicated in the record and an assumed return date may be constructed based on a configurable value (e.g., two weeks from the current date).

The recipient may be determined by multiple possible approaches. For example, the "From" address is one option. Additionally, some campaign management systems can embed recipient identification information in several places in the message header and body to help correlate the message with a particular recipient in the campaign management system's database 30. When the campaign management system 18 executes a subsequent communications campaign, it may invoke exclusion logic 32 to remove any recipients that are determined to be away (e.g., remove the set of away recipients from the total set of target recipients). The exclusion logic 32 may compare the specified launch date for the campaign against the end date in any matching records for each matching recipient. If a recipient match is found and the end date is greater than the launch date (with a configurable+/−margin), then the recipient can be excluded from the campaign.

To execute "welcome back" campaigns that are designed to arrive in the recipients' inboxes shortly after their return, the campaign management system 18 may run the same campaign logic periodically (e.g., daily) and construct a new list of applicable recipients each period. In this case, the campaign management system 18 may query the database 30 using selection logic 34 to find all recipients whose end date is within the configurable period of time from the planned launch date. The selection logic 34 can ensure that the end date is within the specified period of the launch date and not merely that the launch date is greater than the end date. Such an approach ensures that a new batch will be selected in each period and no recipients are selected twice (even if there is other logic to prevent selection in multiple waves). The selected list of recipients may be applied to further selection and segmentation logic (not shown) that is defined by the campaign itself. The final list may then be used for the welcome back campaign.

Turning now to FIG. 3, an architecture 36 to broker the transfer of away status information between different entities is shown. In this variation, users may deliberately or implicitly supply their away status to different collector organizations such as collectors 38 (38a-38c). Such an indication may be supplied by a web form, a paper form that is then used for data entry by the collector 38, or as a byproduct of an electronic transaction such as booking a travel reservation (e.g., with a checkbox to "Reduce my email during my travel by anonymously sharing my travel dates"). A special case of a users/collector pair is the architecture 16 (FIG. 2) described above where the away status information is determined from away response automatic replies. In the illustrated example, the output of the database 30 (FIG. 2) corresponds to the output of one or more of the collectors 38. Another form of user preference designation may be out-of-office or on-vacation configuration options found in many email systems. In such cases, one or more of the collectors 38 may include an email system.

A collector 38 may be any organization or entity that in some fashion is able to determine the future "away" plans for a corresponding email address or other form of contact. The collector 38 may use the collected information locally (as already discussed), or it may transfer that information to a centralized broker 40 that can allow multiple senders 42 (42a-42c) to benefit from the information and respect the recipients' implied or explicit wishes. Such an approach may also benefit the recipients/users, since they can supply their information once, but all senders 42 that have subscribed to the broker service will respect their wishes. Accordingly, recipients may achieve less email clutter from all senders 42 to whom they subscribe and who also participate in the brokering service.

In order to protect the privacy of the recipients' contact information/identifiers (e.g., email addresses, phone numbers, fax numbers, social media names and login names), when it is sent to the broker, a cryptographic hash function may be applied to each contact identifier before being sent to the broker 40. A property of the cryptographic hash function may be that it is not feasible to recover the contact identifier from the encrypted string. A further property might be that for a given hash function and contact identifier, the resulting encrypted string will always be the same. The broker 40 may maintain a database of encrypted contact identifiers and metadata for each such as away status, return date, date recorded, and corresponding collector 38 (e.g., source). A sender 42 may function similar to the standalone sender 20 (FIG. 2), already discussed. When used in connection with a broker 40, the selection logic 34 (FIG. 2) and exclusion logic 32 (FIG. 2) can make a request to the broker 40 instead of a local query to the database 30 (FIG. 2).

In order to determine whether a given contact identifier should be suppressed, the sender 42 may apply the cryptographic hash function to the contact identifier to obtain cryptographic information and provide that cryptographic information to the broker 40. The broker 40 may then look up the address in the broker's database using the hashed address as a key. Since the hash is consistent, the broker 40 is able to conduct the lookup without needing to know the actual contact identifier. If the broker 40 finds a match, it may return the matching cryptographic information and corresponding metadata for the supplied hashed address.

There are a number of variations for how a sender 42 can use the broker 40 to determine how to treat a contact identifier. For example, hashed addresses may be supplied singly or in batches to the broker 40, which may in turn look up the information and return the metadata for each supplied address. The return of the metadata could be done via a web services call, file transfer, HTTP POST operation, HTTP GET operation or various other means. It may also be possible for the broker 40 to make available the entire database so that the sender 42 could download the database locally and then perform its own lookups. Another variation may be for the sender 42 to provide an upload of all addresses in which it is interested in (e.g., with periodic incremental updates), then whenever the broker 40 receives an update from a collector 38 that matches a sender's subscriber list, the broker 40 can send a message to the sender 42 so that the sender 42 may update its local database. Alternatively, the broker 40 could simply maintain a list of updates and provide that list when a sender 42 makes a request for updates. The sender 42 in this case may again receive the updates and apply them to its local database.

FIG. 4 shows a method of operating communications campaigns. Illustrated processing block 46 provides for identifying a set of recipients associated with a communications campaign. The recipients identified in block 46 may therefore correspond to, for example, the plurality of target recipients 10 (FIG. 1), already discussed. A set of recipients associated with an away status may be identified at block 48, wherein the recipients identified at block 48 might correspond to the set of away recipients 10a (FIG. 1), already discussed. Block 50 may provide for removing the set of recipients associated with an away status (e.g., first set of recipients) from the set of recipients associated with the communications campaign (e.g., second set of recipients) to obtain a set of remaining available recipients (e.g., third set of recipients). Thus, the set of remaining available recipients may correspond to the set of available recipients 10b (FIG. 1), already discussed. Illustrated block 52 provides for sending a message to the set of remaining available recipients. The message may be part of an original communications campaign such as, for example, the original communications campaign 12 (FIG. 1), already discussed.

The method 44 may also provide for determining that the away status has ceased for one or more of the recipients previously associated with an away status, and sending a second message to the recipients for which the away status has ceased. The second message may reference the away status or be otherwise tailored to inform the recipient that the sender is respecting the implied or express wishes of the recipient not to be contacted while out of the office or on-vacation.

FIG. 5 shows a method 54 of brokering away status information. Illustrated block 56 provides for receiving communications from a plurality of collectors of away status information. In one example, the collectors as well as senders of messages may be enrolled into the brokering system via a subscription process. The communications from the collectors may include cryptographic information resulting from the application of a cryptographic hash function to contact identifiers corresponding to recipients of messages. Thus, block 56 might involve receiving a first communication from a first collector such as, for example, the collector 38a (FIG. 3) and receiving a second communication from a second collector such as, for example, the collector 38b (FIG. 3), wherein the first and second communications include first and second cryptographic information, respectively.

A database may be populated with away status information at block 58 based on the communications from the collectors. In one example, the database is populated with the cryptographic information as well as any metadata describing the details of the away statuses (e.g., departure date information, return date information). An away status request may be received at block 60 from a sender of messages, wherein illustrated block 62 conducts a search of a database in response to the request. A response may be transmitted to the requesting sender based on the search at block 64.

FIG. 6 shows a computing device 66 having a processor 68, mass storage 70 (e.g., read only memory/ROM, optical disk, flash memory), a network interface 72, and system memory 74 (e.g., random access memory/RAM). In the illustrated example, the processor 68 is configured to execute logic 76, wherein the logic 76 may implement one or more aspects of the method 44 (FIG. 4) and/or the method 54 (FIG. 5), already discussed. Thus, the logic 76 may enable the computing device 66 to function as a campaign management system and/or brokering system, depending upon the circumstances. The logic 76 may also be implemented as a software application that is distributed among many computers (e.g., local or remote). Thus, while a single computer could provide the functionality described herein, systems implementing these features can use many interconnected computers (e.g., for scalability as well as modular implementation).

Techniques described herein may therefore provide for detecting and then respecting a recipient's implied wishes by examining the content of their automatic email replies. When the sending mailing system receives an automatic reply, it may first examine the content of the reply to determine if the reply is an away reply. If so, the message may be further parsed to attempt to extract a return date for the recipient. This date may then be persisted in a database. When a subsequent campaign is created, the list of candidate recipients may be compared to the "away" database in conjunction with the planned launch date for the campaign. If the launch date is before the recipient's return date (with a configurable margin), then the recipient may be suppressed for the current campaign.

In another mode, a specific campaign can be constructed to target recipients within a configurable amount of time from their recorded return date. Such a campaign may typically be run daily, selecting the recipients who returned the previous day (with a configurable offset). The content of the message of such a campaign could reference the fact that the system acknowledged the recipient's implied desire not to receive email during their time away.

A variation on this approach may be to allow each recipient to explicitly control their preference to not be contacted during a period of time. Therefore, instead of solely relying on reacting to automatic email replies, the system could use a web form to allow a recipient to indicate a mail hold period. This form could be part of a "preference center" or a part of an unsubscribe form. As part of the later, the existence of this option may be enough for some recipients to simply stop being contacted for a period of time instead of unsubscribing altogether.

Another variation may involve using one or more organizations to collect away information and then with the recipients' permission, to syndicate this information to bulk mailers who subscribe to the syndication feed. Example collector organizations might be the United States Postal Service (USPS), corporate mail systems, third-party mail systems, airlines, hotels, and online travel agencies. A syndication service may be the intermediary to securely collect the preferences (via a cryptographic hash function) and to then provide the service to mailers to indicate if an address (again provided by a cryptographic hash function) should be suppressed. The collectors may provide such a service as an added value feature.

Accordingly, fewer recipients may unsubscribe as a result of receiving messages after indicating that they are away. Further, the risk of brand and relationship impairment may be reduced. Implementing such an approach can also reduce the extra resource costs for sending messages that will be ignored and may reduce the data skew that results from contacting recipients that are not making an active decision to open a message. For example, email open rates may be calculated based only on messages that have been exposed to a person, under the techniques described herein. The ability to back off, create email silence (during the away period) and then contact a recipient with a personalized message may demonstrate a respect for the recipient's implied wishes and can help to build brand reputation, strengthen the dialog, and gain a greater impact from the "welcome back" message compared to the standard steady-state stream of contacts.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A computer program product comprising:
a non-transitory computer readable storage medium; and
computer usable code stored on the computer readable storage medium, where, when executed by a processor, the computer usable code causes a computer to:
receive a bulk communications database from a brokering system and obtain a first set of recipients from the database, wherein the brokering system aggregates away status information from a plurality of different collectors remote from the brokering system that have different architectures, each of the plurality of different collectors determining an away status from analyzing an item selected from a group consisting of a bounce-back message, a web form, and a byproduct of an electronic transaction, wherein analyzing the bounce-back message comprises parsing the bounce-back message for contact information and date information;
remove the first set of recipients from a second set of recipients associated with a bulk communications campaign to obtain a third set of recipients;
apply a cryptographic hash function to contact information corresponding to the second set of recipients to obtain first cryptographic information;
submit the first cryptographic information to the brokering system; and
send a first message to the third set of recipients.

2. The computer program product of claim 1, wherein the computer usable code, when executed, causes a computer to determine that the away status has ceased for one or more of the first set of recipients; and
send a second message to the one or more of the first set of recipients for which the away status has ceased.

3. The computer program product of claim 2, wherein the second message references the away status.

4. The computer program product of claim 1, wherein the contact information includes at least one of an email address, a phone number, a fax number, a social media name, or a login name.

5. The computer program product of claim 1, wherein the computer usable code, when executed, causes a computer to:
- apply a cryptographic hash function to contact information corresponding to the first set of recipients to obtain additional cryptographic information; and
- send the additional cryptographic information and corresponding away status information to the brokering system.

6. The computer program product of claim 1, wherein the away status is at least one of an out-of-office status or an on-vacation status.

* * * * *